June 7, 1960 K. A. FISHER 2,940,042

PULSE PHASE DETECTOR

Filed Feb. 25, 1957

INVENTOR
K. A. FISHER
BY *Walter M. Hill*
ATTORNEY

United States Patent Office 2,940,042

Patented June 7, 1960

2,940,042

PULSE PHASE DETECTOR

Kenneth A. Fisher, Winston-Salem, N.C., assignor to Western Electric Company, Incorporated, New York, N.Y., a corporation of New York Filed Feb. 25, 1957, Ser. No. 642,206

5 Claims. (Cl. 324—83)

This invention relates to phase detector and discriminator circuits and, more particularly, to a phase detector circuit useful in pulse transmission systems.

Most phase detectors are for operation with sinusoidal signals and generally involve vacuum tubes, transformers, and other circuit elements which usually result in a relatively bulky structure. Pulse transmission systems frequently involve automatic frequency control and synchronizing circuits. In such circuits, a phase detector is of considerable value.

One object of this invention is to produce a direct voltage varying in accordance with the phase relation between a reference pulse and a signal pulse of nominally the same frequency.

Another object of the invention is to simplify, improve, and make more compact the apparatus required to detect the relative phase between two pulse voltages of nominally the same frequency.

The foregoing objects are achieved by this invention, which comprises a phase detector having a pair of input terminals for the reference and signal pulses, respectively, whose phase relation is to be detected. A pair of output terminals provide both balanced-to-ground and unbalanced direct voltage outputs, with polarities dependent upon the phase relation. A delay line delays the transmission of the reference pulse for a period preferably equal to the duration of the reference pulse to provide a delayed reference pulse beginning the instant the original reference pulse ends. These two reference pulses are applied to diode gates, which effectively prevent their transmission in the absence of a signal pulse; but, when the signal pulse is coincident with either reference pulse, the associated gate is opened to permit the transmission of the pulse to charge a pair of capacitors. A resistance network connected to these capacitors includes the output terminals.

Figure 1:
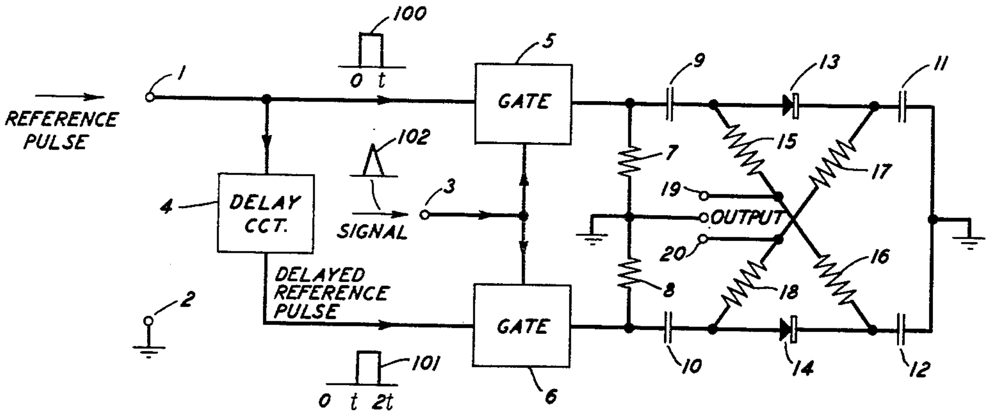
Figure 2:
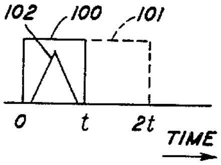
Figure 3:
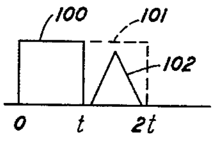
Figure 4:
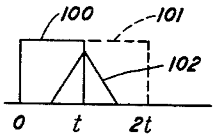
Figure 5:
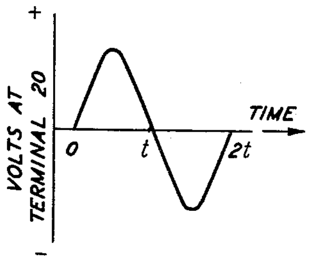
Figure 6:
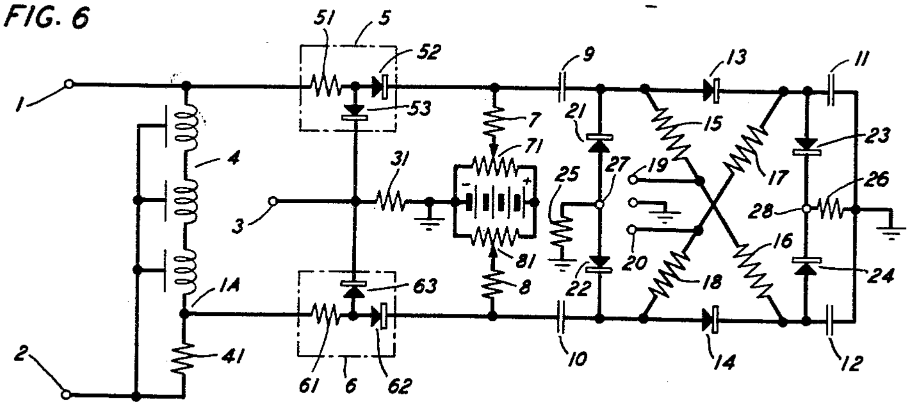

The invention may be better understood by referring to the accompanying drawings in which:

Fig. 1 is a simplified diagram of an embodiment of the invention illustrative of its principles;

Figs. 2, 3, and 4 are illustrative of typical reference and signal pulses showing three different phase relations;

Fig. 5 discloses a typical output characteristic of the apparatus of this invention;

Fig. 6 shows a complete, practical embodiment of the invention; and

Figure 7:
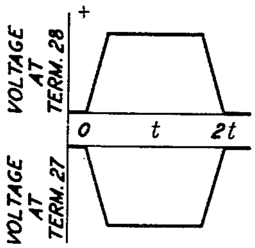

Fig. 7 discloses other output characteristics of the apparatus of Fig. 6 which are useful for various purposes such as automatic gain control.

In Fig. 1, a pair of input terminals 1 and 3 receive the reference pulse and signal pulse, respectively. These pulse voltages are with respect to grounded input terminal 2. The reference pulse received at terminal 1 is assumed to have a square wave form, as shown by wave form 100, although other wave forms may be used. It is assumed that this pulse has a duration of $t$ seconds. A delay circuit 4 also receives this reference pulse and has a delay time preferably equal to the duration of the reference pulse so that its output pulse 101 begins at the instant when time is $t$ seconds and continues until time is equal to $2t$ seconds. Thus, it is evident that the delayed reference pulse 101 begins at the instant that the reference pulse 100 ends and continues for a like period.

The signal pulse 102, whose phase relation with the reference pulse is to be determined, is applied to terminal 3 and may have almost any wave form as, for example, the substantially triangular wave form shown. The electronic gates 5 and 6 are of a conventional character and are arranged to receive the reference and delayed pulses 100 and 101 without transmitting them unless they are received coincident with the signal pulse 102. Upon coincidence of the signal pulse with either the reference pulse or the delayed reference pulse, the corresponding gate is opened permitting transmission of the pulse to the discriminator network shown to the right of the two gates.

The discriminator network comprises four capacitors 9, 10, 11, and 12, two input resistors 7 and 8, four output resistors 15, 16, 17, and 18, and two simple diodes 13 and 14. The output terminals 19 and 20 are connected to the junction of resistors 15 and 16 and to the junction of resistors 17 and 18, respectively.

The over-all function of the circuit of Fig. 1 is that, if the signal pulse 102 is coincident with the reference pulse 100, as indicated in Fig. 2, gate 5 will be opened to permit the transmission of a pulse to input resistor 7 which is relatively small compared with the resistors 15, 16, 17, and 18. For example, resistors 7 and 8 may be in the order of 22,000 ohms while each of resistors 15, 16, 17, and 18 may be in the order of 10 megohms. The pulse thus transmitted by gate 5 appears as a voltage across resistor 7, thereby charging capacitors 9 and 11 through diode 13. The charges received by capacitors 9 and 11 will be trapped thereon by reason of the high reverse resistance of diode 13 and, since these two capacitors are of equal size, their voltages will be substantially equal. It will be noted that a discharge circuit for these two capacitors may be traced from ground through capacitor 11, resistors 17 and 18 through the forward direction of diode 14, resistors 16 and 15 through capacitor 9, and to ground through the relatively low resistance of resistor 7. Under the conditions described, it will be evident that both terminals of diode 14 will be at substantially ground potential so that the potential of output terminal 20 will be at substantially half the charge on capacitor 11. Similarly, the potential of output terminal 19 will be at substantially half the voltage charge on capacitor 9 and will be of a polarity, with respect to ground, opposite that of output terminal 20. Assuming the reference and signal potentials to be positive with respect to ground, this will result in a positive potential developing at output terminal 20 and an equal negative potential developing on output terminal 19.

If, on the other hand, the signal pulse 102 is coincident with the delayed reference pulse 101, as shown in Fig. 3, gate 6 will be opened to transmit a positive pulse to input resistor 8, thereby developing a positive potential on output terminal 19, and an equal but negative potential on output terminal 20. The circuits which produce these output potentials are similar to those described when the pulse was transmitted through gate 5 except that, in this case, it is capacitors 10 and 12 which are charged instead of capacitors 9 and 11.

From the operation described above, it will be evident that if the signal pulse is not coincident with either the reference pulse or the delayed reference pulse, no charging pulse will be transmitted to the discriminator circuit and both output potentials 19 and 20 will be at ground potential. These two terminals will also be at ground potential if the signal pulse has its peak occurring at the instant the reference pulse 100 ends and the delayed reference pulse 101 begins, as shown in Fig. 4. In this case, equal charges are transmitted through both gates 5 and 6 to the four capacitors 9, 10, 11, and 12. Circuit analysis will then show that terminals 19 and 20 will be at ground potential.

The discriminator characteristic shown in Fig. 5 is for terminal 20 and shows the voltage as a function of the relative time coincidence or phase between the signal pulse 102 and the two reference pulses 100 and 101. It will be observed that terminal 20 has a positive direct voltage polarity throughout the period of coincidence between the signal pulse and the reference pulse 100 and that it has a negative direct voltage polarity where the signal pulse 102 is coincident with the delayed reference pulse 101. Moreover, as the signal pulse 102 approaches coincidence with time *t*, as shown in Fig. 4, the discriminator voltage approaches zero. This, of course, is the desired discriminator characteristic and is somewhat similar to that usually obtained with conventional discrinators operating with sine wave inputs.

The practical embodiment of the invention is shown in Fig. 6 in which the delay network 4 is shown as a conventional type. It will be understood that the reference pulse which is received at terminal 1 flows downwardly through the delay network 4 and terminating resistor 41 arriving at terminal 1A at the instant that the reference pulse applied to terminal 1 returns to zero. The reference pulse then appears at terminal 1A for a period equal to the original reference pulse on terminal 1. This pulse at terminal 1A is referred to as the delayed reference pulse.

Gate 5 comprises a resistor 51 and two diodes 52 and 53 connected with their forward directions as symbolically shown in Fig. 6. Similarly, gate 6 comprises a resistor 61 and two diodes 62 and 63. Input resistor 31 for the signal pulse may be of relatively low resistance as, for example, 75 to 100 ohms. Resistors 51 and 61 may be in the order of 1000 ohms. The gates are initially biased from a source comprising potentiometers 71 and 81. For example, the slider of potentiometer 71 applies a positive bias in the reverse direction to diode 52 through resistor 7. This renders diode 52 nonconducting and diode 53 conducting. When the reference pulse is received at terminal 1, substantially the entire voltage of the pulse appears across series resistor 51 since diode 53 has a very low impedance and resistor 31 is relatively small. Should the signal pulse received at terminal 3 be coincident with the reference pulse on terminal 1, it will bring terminal 3 to a positive potential with respect to ground, thereby overcoming the bias provided by potentiometer 71 and causing diode 53 to have a high impedance and diode 52 at low impedance. It is evident therefore, that the pulse will be transmitted through diode 52 to the discriminator network to charge capacitors 9 and 11. The operation of gate 6 is identical with that described except that in this case, of course, the pulse is transmitted only when the signal pulse is coincident with the delayed reference pulse.

Fig. 6 also shows some additional diodes and resistors in the discriminator circuit. These comprise diodes 21, 22, 23, 24, and resistors 25 and 26. The purpose of these diodes and resistors is to provide individual leakage paths for the four capacitors 9, 10, 11, and 12 so that during periods when no pulses are being transmitted through gates 5 and 6, the charges on all four capacitors may return more rapidly and uniformly toward zero. Thus, if the signal applied to input terminal 3 is amplitude modulated, an amplitude modulated output signal can be obtained from either terminal 27 or terminal 28 in the discriminator circuit. The signal output from terminal 27 will always be negative to ground, while that from terminal 28 will always be positive to ground, as shown in Fig. 7. Hence, these outputs will be rectified and will provide a choice of polarity for any desired purpose. Moreover, because these outputs are rectified, they may be filtered by conventional automatic gain control filter means and used for the automatic gain control of an amplifier in the signal channel in accordance with conventional practice.

What is claimed is:

1. A pulse phase detector for producing a direct voltage varying in accordance with the phase relation between a reference pulse and a signal pulse of nominally the same frequency, said detector comprising a first terminal for receiving the reference pulse, a delay circuit connected to said terminal to produce a delayed reference pulse, a second terminal for receiving the signal pulse, control means connected to said two terminals and to said delay means for producing a first output pulse upon coincidence of said signal and reference pulses and a second output pulse upon coincidence of said signal and delayed reference pulses, a discriminator circuit including a pair of diodes, each having an anode and a cathode, means forming an assembly of one diode serially connected between a pair of capacitors, means connecting said assembly to said control means to receive said first output pulse, means forming a second assembly of the other diode serially connected between a second pair of capacitors, means connecting said second assembly to said control means to receive said second output pulse, one pair of resistors serially connected between the anode of one diode and the cathode of the other, a second pair of resistors similarly connected between the remaining anode and cathode, the junction between each pair of resistors comprising an output terminal of said detector.

2. A pulse phase detector for producing a direct voltage varying in accordance with the phase relation between a reference pulse and a signal pulse of nominally the same frequency, said detector comprising a first terminal for receiving the reference pulse, a delay circuit connected to said terminal to produce a delayed reference pulse, a second terminal for receiving the signal pulse, a first control means connected to said two terminals for transmitting a first output pulse upon the time coincidence of said reference and signal pulses, a second control means connected to said delay circuit and to said second terminal for transmitting a second output pulse upon the time coincidence of said delayed reference and signal pulses, a discriminator circuit including a pair of diodes, each having an anode and a cathode, means forming an assembly of one diode serially connected between two capacitors, means connecting said assembly to said first control means to receive said first output pulse, means forming a second assembly of the other diode serially connected between a second pair of capacitors, means connecting said second assembly to said second control means to receive said second output pulse, one pair of resistors serially connected between the anode of one diode and the cathode of the other, a second pair of resistors similarly connected between the remaining anode and cathode, the junction between each pair of resistors comprising an output terminal of said detector.

3. A pulse phase detector for producing a direct voltage varying in accordance with the phase relation between a reference pulse and a signal pulse of nominally the same frequency, said detector comprising a terminal for receiving the reference pulse, a delay circuit connected to said terminal to produce a delayed reference pulse, a first electronic gate also connected to said terminal for controlling the transmission of said reference pulse, a second electronic gate connected to said delay circuit to control the transmission of said delayed pulse, a second terminal for receiving the signal pulse, said second terminal being connected to both of said gates to permit transmission therethrough of said reference pulses upon their time coincidence with said signal pulse, a pair of diodes, each having an anode and a cathode, means forming an assembly of one diode serially connected between a pair of capacitors, means connecting said assembly between said first gate and ground, means forming a second assembly of the other diode serially connected between a second pair of capacitors, means connecting said second assembly between the second gate and ground, one pair of resistors serially connected between the anode of one diode and the cathode of the other, a second pair of resistors similarly connected between the remaining anode and cathode, the junction between each pair of resistors comprising an output terminal of said detector.

4. The combination of the detector of claim 3 with a second pair and a third pair of diodes, each of said diodes having an anode and a cathode, a resistance means connecting the anodes of said second pair of diodes to ground, means connecting the cathodes of said second pair of diodes, respectively, to the anodes of said first named pair of diodes, another resistance means connecting the cathodes of said third pair of diodes to ground, and means connecting the anodes of said third pair of diodes, respectively, to the cathodes of said first named pair of diodes.

5. The combination of claim 4 and a terminal connected to the ungrounded side of one of said resistance means whereby a rectified output of signal pulses may be obtained.

References Cited in the file of this patent

UNITED STATES PATENTS

| | | |
|---|---|---|
| 2,703,380 | Fraser | Mar. 1, 1955 |
| 2,734,168 | Zachary et al. | Feb. 7, 1956 |
| 2,812,435 | Lyon | Nov. 5, 1957 |
| 2,813,241 | Smith et al. | Nov. 12, 1957 |